(12) United States Patent
Sakai et al.

(10) Patent No.: US 9,382,493 B2
(45) Date of Patent: *Jul. 5, 2016

(54) ASH-FREE COAL PRODUCTION METHOD

(71) Applicant: Kobe Steel, Ltd., Hyogo (JP)

(72) Inventors: Koji Sakai, Hyogo (JP); Noriyuki Okuyama, Hyogo (JP); Shigeru Kinoshita, Hyogo (JP); Takuya Yoshida, Hyogo (JP); Takahiro Shishido, Hyogo (JP); Maki Hamaguchi, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 40 days.

This patent is subject to a terminal disclaimer.

(21) Appl. No.: 14/358,881

(22) PCT Filed: Dec. 17, 2012

(86) PCT No.: PCT/JP2012/082604
§ 371 (c)(1),
(2) Date: May 16, 2014

(87) PCT Pub. No.: WO2013/099665
PCT Pub. Date: Jul. 4, 2013

(65) Prior Publication Data
US 2014/0325901 A1    Nov. 6, 2014

(30) Foreign Application Priority Data

Dec. 28, 2011  (JP) .................................. 2011-288710
Dec. 28, 2011  (JP) .................................. 2011-288711

(51) Int. Cl.
*C10L 5/04*        (2006.01)
*C10L 9/00*        (2006.01)
*B01D 11/02*       (2006.01)
*B01D 21/02*       (2006.01)

(52) U.S. Cl.
CPC ............... *C10L 5/04* (2013.01); *B01D 11/0257* (2013.01); *C10L 9/00* (2013.01); *B01D 21/02* (2013.01); *C10L 2290/06* (2013.01); *C10L 2290/08* (2013.01); *C10L 2290/12* (2013.01); *C10L 2290/22* (2013.01); *C10L 2290/24* (2013.01); *C10L 2290/30* (2013.01); *C10L 2290/48* (2013.01); *C10L 2290/544* (2013.01)

(58) Field of Classification Search
CPC ..................................... C10L 5/04; C10L 9/00
USPC ................................................... 44/627, 620
See application file for complete search history.

(56) References Cited

U.S. PATENT DOCUMENTS 3,892,654 A    7/1975  Wright et al.
4,021,328 A    5/1977  Wolk
(Continued)

FOREIGN PATENT DOCUMENTS

JP    S50-10859 A    2/1975
JP    S50-25483 A    3/1975
(Continued)

OTHER PUBLICATIONS

International Search Report; PCT/JP2012/082604; Mar. 5, 2013.
(Continued)

*Primary Examiner* — Ellen McAvoy
(74) *Attorney, Agent, or Firm* — Studebaker & Brackett PC

(57) ABSTRACT

Provided is an ash-free coal production method without the need to once re-liquefy and form an ash-free coal. The ash-free coal production method includes an extraction step of mixing coal with a solvent to prepare a slurry and heating the slurry to extract a solvent-soluble coal component; a separation step of separating a solution containing the solvent-soluble coal component from the slurry obtained from the extraction step; an ash-free coal obtaining step of evaporatively separating the solvent from the solution separated in the separation step to obtain an ash-free coal. The ash-free coal obtaining step in the production method is performed so that the solvent is evaporatively separated from the solution to give a liquid ash-free coal, and the liquid ash-free coal is brought into contact with a solidifier (e.g., water) to solidify into a predetermined shape.

1 Claim, 6 Drawing Sheets

(56) References Cited

U.S. PATENT DOCUMENTS

| | | | |
|---|---|---|---|
| 4,618,346 A * | 10/1986 | Schapiro et al. | 44/624 |
| 7,799,100 B2 * | 9/2010 | Harada et al. | 44/282 |
| 8,790,420 B2 * | 7/2014 | Harada et al. | 44/282 |

FOREIGN PATENT DOCUMENTS

| JP | S50-119806 A | 9/1975 |
|---|---|---|
| JP | S51-135902 A | 11/1976 |
| JP | S55-75485 A | 6/1980 |
| JP | 2005-120185 A | 5/2005 |
| JP | S50-25483 A | 3/2009 |

OTHER PUBLICATIONS

Written Opinion of the International Searching Authority; PCT/JP2012/082604; Mar. 5, 2013.

* cited by examiner

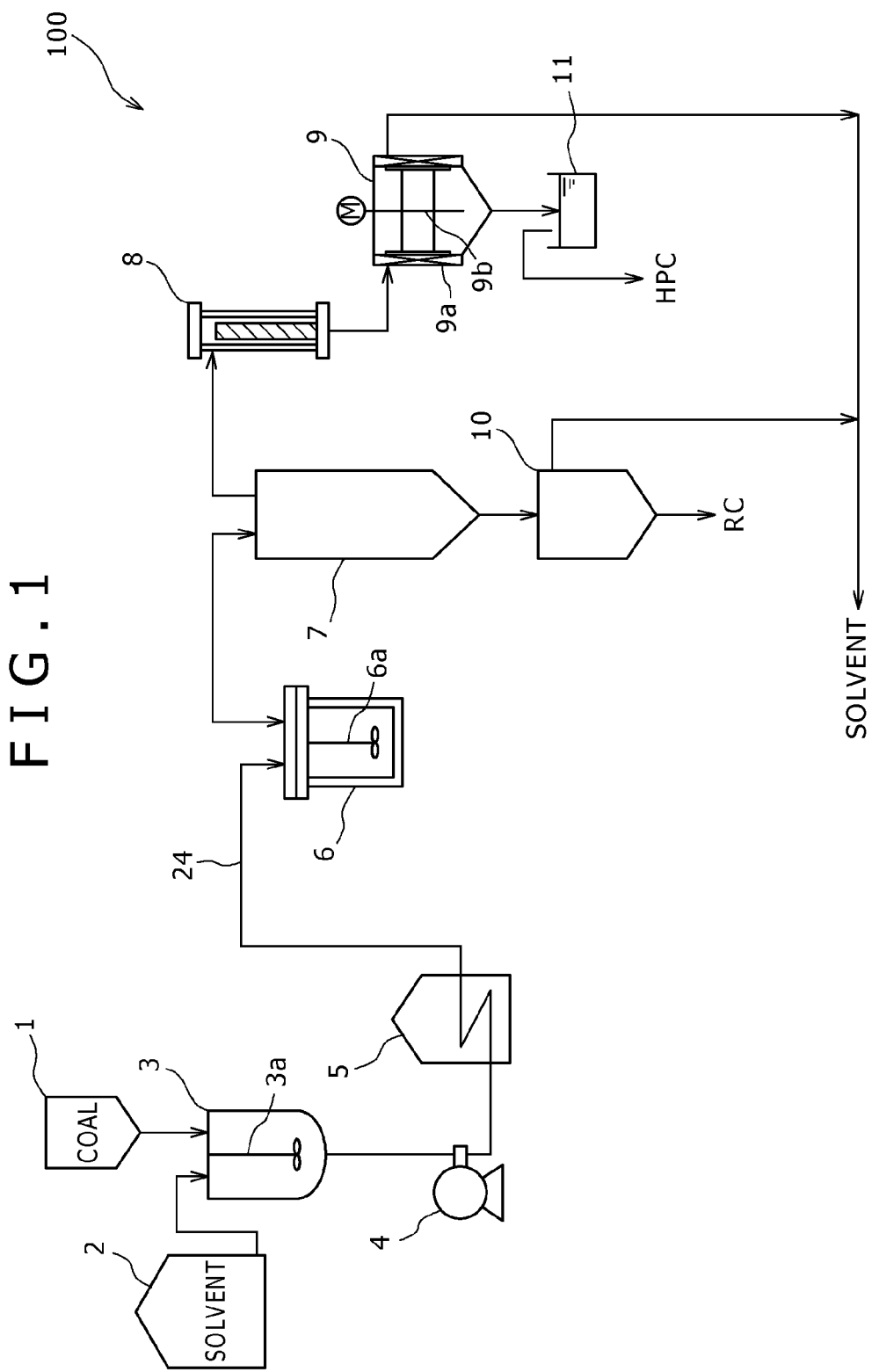
F I G . 1

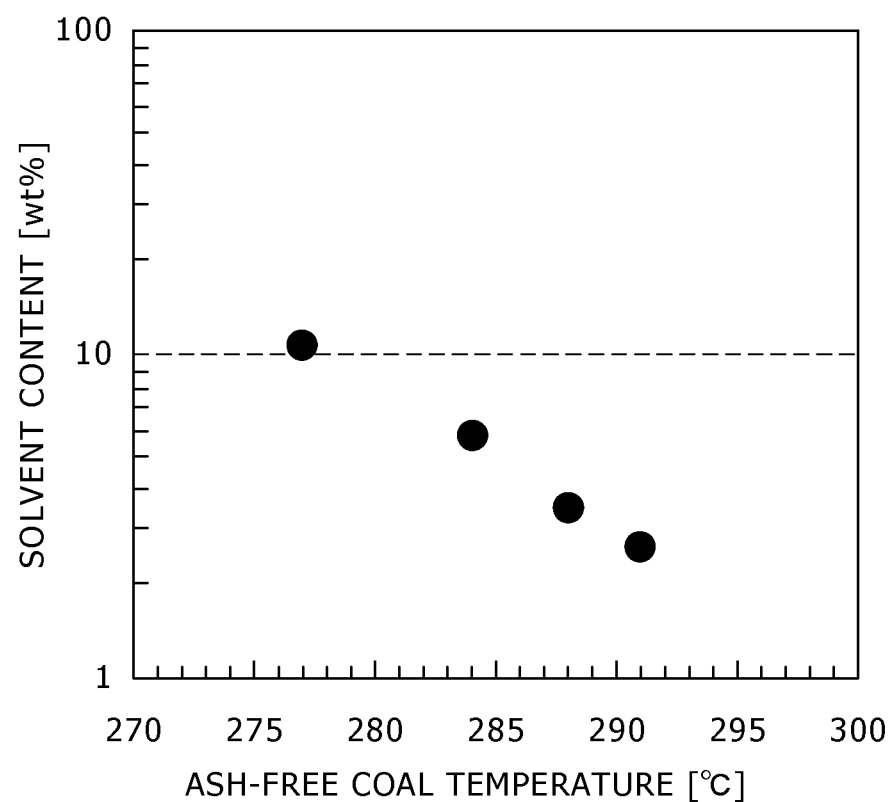
F I G . 5

ASH-FREE COAL PRODUCTION METHOD

TECHNICAL FIELD

The present invention relates to a method for producing an ash-free coal by removing ash from coal.

BACKGROUND ART

An exemplary ash-free coal production method is one described in Patent literature (PTL) 1. The ash-free coal production method described in PTL 1 produces an ash-free coal by mixing coal with a solvent to prepare a slurry; heating the obtained slurry to extract a solvent-soluble coal component; separating the slurry containing the extracted coal component into a solution containing the solvent-soluble coal component and a solvent-insoluble-component-enriched fluid containing a solvent-insoluble coal component; and recovering the solvent from the separated solution. PTL 1 refers to spray drying as a process of recovering the solvent to give the ash-free coal.

The spray drying described in PTL 1 allows an organic substance and an inorganic substance in the ash-free coal to precipitate separately and enables easy removal of a fine inorganic substance and a metal component from the solution containing the solvent-soluble coal component, where the inorganic substance is mixed in the solution in a small amount, and the metal component is dissolved in the solvent.

CITATION LIST

Patent Literature

PTL 1; Japanese Unexamined Patent Application Publication (JP-A) No. 2005-120185

SUMMARY OF INVENTION

Technical Problem

The spray drying, when employed as a process for recovering or removing the solvent to yield an ash-free coal, gives the above-mentioned advantage, but also suffers from disadvantages as follows. The resulting ash-free coal obtained by spray drying is in "powdery" form. The powdery ash-free coal should be formed typically into briquettes or flakes in an extra process prior to shipping as a product. Forming into briquettes requires a forming apparatus; whereas forming into flakes requires the steps of heating the powdery ash-free coal to liquefy into a liquid and forming the liquid into flakes. The forming process (or apparatus) proportionally increases the production cost of the ash-free coal.

The method described in PTL 1 removes approximately 100 percent by weight of the solvent from the solution; and the solvent remains in the ash-free coal in a content of from 0 to 2 percent by weight. Thus, the yield of ash-free coal upon production is approximately determined by the extraction rate of coal used as a material. The yield of ash-free coal refers to "production efficiency" in a manner, and the higher the yield is, the better. However, it is difficult for the ash-free coal production method described in PTL 1 to improve the yield of ash-free coal, because the yield of ash-free coal is approximately determined by the extraction rate of coal to be used as a raw material. A possible solution to give a higher yield of ash-free coal is mixing of the solvent-insoluble-component-enriched fluid with the ash-free coal, but this disadvantageously causes increase in ash content.

Ash-free coals are generally solid at room temperature, exhibit higher fluidity and become handleable as a liquid with an elevating temperature. The ash-free coal produced by the ash-free coal production method described in PTL 1, however, has a high initial softening temperature at which the solid ash-free coal starts melting. The ash-free coal exhibits poor handleability because it is incapable of handling as a liquid unless it is heated to a considerably high temperature.

As used herein the term "yield of ash-free coal" refers to the ratio of the mass of the material coal to the mass of the produced ash-free coal. The term "handleability" refers to ease of ash-free coal handling. The ash-free coal, when handleable as a liquid, can be easily handled.

The present invention has been made under the circumstances, and an object thereof is to provide an ash-free coal production method without the need for once converting the ash-free coal to a liquid and forming the liquefied ash-free coal.

Another object of the present invention is to provide an ash-free coal production method capable of giving an ash-free coal with better handleability in a higher yield.

Solution to Problem

The present invention provides a method for producing an ash-free coal, the method including the steps of extracting a solvent-soluble coal component from coal by mixing the coal with a solvent to prepare a slurry and heating the prepared slurry; separating a solution containing the solvent-soluble coal component from the slurry after the extraction step; and obtaining an ash-free coal by evaporatively separating the solvent from the solution separated in the separation step. The ash-free coal production method includes, in the ash-free coal obtaining step, the substeps of evaporatively separating the solvent from the solution to give a liquid ash-free coal; and solidifying the obtained liquid ash-free coal into a predetermined shape by bringing the liquid ash-free coal into contact with a solidifier.

In addition, the present invention provides a method for producing an ash-free coal, the method including the steps of extracting a solvent-soluble coal component from coal by mixing the coal with a solvent to prepare a slurry and heating the prepared slurry; separating a solution containing the coal component from the slurry containing the extracted coal component, where the coal component is extracted in the extraction step; and obtaining an ash-free coal by evaporatively separating the solvent from the solution separated in the separation step, in which the ash-free coal obtaining step is performed so as to allow the solvent to remain in the ash-free coal.

Advantageous Effects of Invention

The ash-free coal production method according to an embodiment of the present invention enables formation of an ash-free coal without once re-liquefying the ash-free coal.

The ash-free coal production method according to another embodiment of the present invention can give ash-free coal with better handleability in a higher yield.

BRIEF DESCRIPTION OF DRAWINGS

FIG. 1 is a block diagram illustrating ash-free coal production equipment for the explanation of an ash-free coal production method according to a first embodiment of the present invention.

FIG. 5 is a graph illustrating measurement results on solvent content.

DESCRIPTION OF EMBODIMENTS

Figure 2:
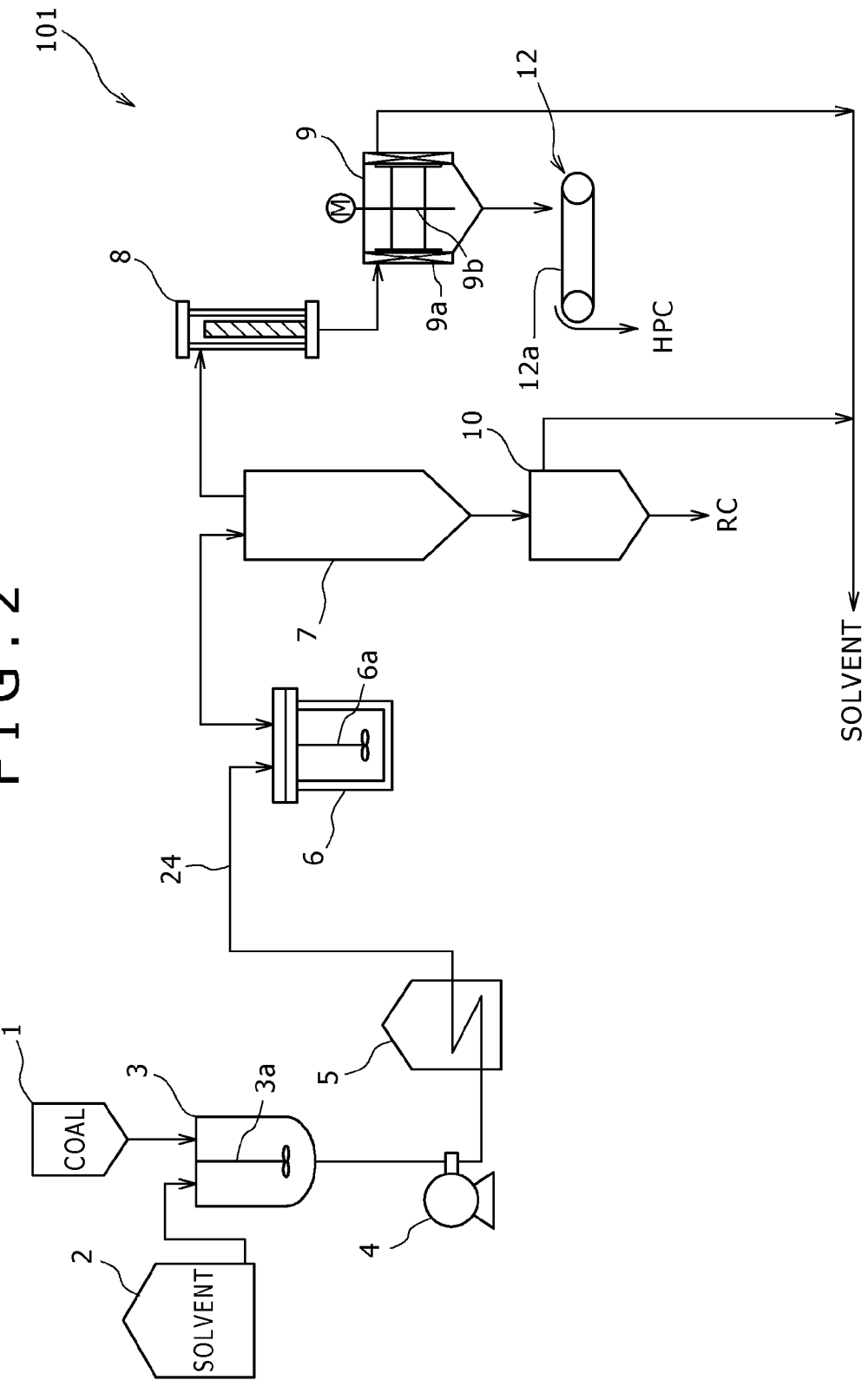
FIG. 2 is a block diagram illustrating ash-free coal production equipment for the explanation of an ash-free coal production method according to a second embodiment of the present invention.

Some embodiments of the present invention will be illustrated with reference to the attached drawings.

First Embodiment

As illustrated in FIG. 1, ash-free coal production equipment 100 includes a coal hopper 1, a solvent tank 2, a slurry preparation tank 3, a transfer pump 4, a preheater 5, an extractor 6, a gravitational settling tank 7, a filter unit 8, a thin-film distillator 9, and a water tank 11 in this order from the upstream of the ash-free coal (hypercoal; HPC) production steps. The ash-free coal production equipment 100 further includes a solvent separator 10 downstream from the gravitational settling tank 7. The solvent separator 10 is arranged to evaporatively separate the solvent from a solvent-insoluble-component-enriched fluid (solids-enriched fluid) separated in the gravitational settling tank 7 and to yield a residue coal (namely, to separate and recover the solvent from the solids-enriched fluid).

The ash-free coal production method according to the present embodiment includes an extraction step, a separation step, and an ash-free coal obtaining step. The individual steps will be illustrated below. The material coal (coal feedstock) in the production method is not limited and may be bituminous coal having a high extraction rate (ash-free coal recovery rate) or more inexpensive low-quality coal (e.g., subbituminous coal or lignite). As used herein the term "ash-free coal" refers to a coal having an ash content of 5 percent by weight or less, and preferably 3 percent by weight or less.

Extraction Step

The extraction step is the step of extracting a solvent-soluble coal component from coal by mixing the coal with a solvent to give a slurry and heating the slurry. The extraction step in the present embodiment includes a slurry preparation substep of mixing coal with a solvent to prepare a slurry; and a solvent-soluble component extraction substep of heating the slurry prepared in the slurry preparation substep to extract a solvent-soluble coal component.

In this step, coal is mixed with a solvent to give a slurry, and the slurry is heated to extract a solvent-soluble coal component. This may be performed by mixing the material coal with a solvent having a high dissolving power (solvency) with respect to the coal to give a slurry, and heating the slurry to extract an organic component in the coal. The solvent herein is often an aromatic solvent (hydrogen-donor or non-hydrogen-donor solvent).

The non-hydrogen-donor solvent is a coal derivative that is purified from a carbonization product of coal, mainly contains bicyclic aromatic compounds, and serves as a solvent. The non-hydrogen-donor solvent is stable even under heating, has high affinity for coal, can thereby extract a soluble component ("coal component" herein) in a high rate, and is easily recoverable by a process such as distillation. The rate of extraction of the soluble component is hereinafter also referred to as "extraction rate". Principal components of the non-hydrogen-donor solvent are exemplified by bicyclic aromatic compounds such as naphthalene, methylnaphthalene, dimethylnaphthalene, and trimethylnaphthalene. The non-hydrogen-donor solvent may further include other components such as naphthalenes, anthracenes, and fluorenes each having an aliphatic side chain; and alkylbenzenes corresponding to them, except with biphenyl and/or a long-chain aliphatic side chain.

The above description has been made by taking a non-hydrogen-donor compound as an example of the solvent to be used. Certainly, a hydrogen-donor compound (including a coal-derived liquid) typified by tetralin can also be used as the solvent. The hydrogen-donor solvent, when used, contributes to a higher yield of the ash-free coal.

The solvent may have a boiling point not critical. A solvent having a boiling point of typically from 180° C. to 300° C., and particularly preferably from 240° C. to 280° C. is preferably used so as to reduce pressure in the extraction step and the separation step, and to provide a satisfactory extraction rate in the extraction step and a satisfactory solvent recovery rate typically in the ash-free coal obtaining step.

Slurry Preparation Substep

The slurry preparation substep is performed in the slurry preparation tank 3 illustrated in FIG. 1. Into the slurry preparation tank 3, the material coal (coal feedstock) and the solvent are charged from the coal hopper 1 and the solvent tank 2, respectively. The coal and solvent charged into the slurry preparation tank 3 are mixed with each other by a stirrer 3a to form a slurry containing the coal and the solvent.

The coal may be mixed with the solvent in a mixing ratio of typically from 10 to 50 percent by weight, and more preferably from 20 to 35 percent by weight, on a dry coal basis.

Solvent-Soluble Component Extraction Substep

The solvent-soluble component extraction substep is performed in the preheater 5 and the extractor 6 in FIG. 1. The slurry prepared in the slurry preparation tank 3 is once fed to the preheater 5 by the transfer pump 4, heated up to a predetermined temperature, then fed to the extractor 6, and held at the predetermined temperature with stirring by a stirrer 6a to perform extraction.

A heating temperature in the solvent-soluble component extraction substep is not critical, as long as the solvent-soluble component can be dissolved, but is typically from 300° C. to 420° C., and more preferably from 360° C. to 400° C. The temperature range is preferred for sufficient dissolution of the solvent-soluble component and a higher extraction rate.

A heating time (extraction time) is also not critical, but is typically from 10 to 60 minutes for sufficient dissolution and a higher extraction rate. The heating time herein is a total sum of heating times in the preheater 5 and in the extractor 6.

The solvent-soluble component extraction substep is performed in the presence of an inert gas such as nitrogen gas. The inside pressure of the extractor 6 is preferably from 1.0 to 2.0 MPa, although it may vary depending on the extraction temperature and the vapor pressure of the solvent to be used. If the inside pressure of the extractor 6 is lower than the solvent vapor pressure, the solvent fails to be trapped in a liquid phase due to its volatilization, and this impedes extraction. Trapping of the solvent in the liquid phase requires a pressure higher than the solvent vapor pressure. In contrast, an excessively high inside pressure may cause higher equipment cost and operation cost, thus being uneconomical.

In the present embodiment, the coal and the solvent are mixed with each other to give a slurry, and the slurry is heated to extract a solvent-soluble coal component from the coal. In another embodiment, the solvent alone is formerly heated, the coal is fed as intact (as dried) into the heated high-temperature solvent (e.g., at 380° C.) and thereby mixed with the solvent and heated to extract a solvent-soluble component from the coal with the solvent.

A way to heat the solvent alone formerly and to feed the coal as intact (as dried) into the heated high-temperature solvent (e.g., at 380° C.) is exemplified in an embodiment as follows. The coal hopper 1 is arranged not upstream from the transfer pump 4, but in a pipe 24 or in the extractor 6 so as to directly feed the coal (to the heated solvent). The pipe 24 connects between the preheater 5 and the extractor 6. In this embodiment, the solvent and other components are prevented from running back into the coal hopper 1 typically by pressurizing the joint between the coal hopper 1 and the pipe 24 or the extractor 6 with an inert gas such as nitrogen gas. The equipment according to the embodiment can advantageously omit the slurry preparation tank 3, although it requires prevention of the solvent and other components from running back into the coal hopper 1 typically by pressurization of the joint between the coal hopper 1 and the pipe 24 or the extractor 6 with an inert gas such as nitrogen gas.

Separation Step

The separation step is the step of separating a solution from the slurry obtained from the extraction step, where the solution contains the coal component dissolved in the solvent. In other words, the separation step is the step of separating the slurry obtained from the extraction step into a solvent-insoluble-component-enriched fluid (solids-enriched fluid) and a solution containing the coal component dissolved in the solvent. The separation step is performed in the gravitational settling tank 7 in FIG. 1. The slurry obtained from the extraction step is separated in the gravitational settling tank 7 into a supernatant liquid as a solution and a solids-enriched fluid (gravitational settling technique). The supernatant liquid in an upper part of the gravitational settling tank 7 is discharged, where necessary via the filter unit 8, to the thin-film distillator 9; and the solids-enriched fluid settling in a lower part of the gravitational settling tank 7 is discharged to the solvent separator 10.

The gravitational settling technique is the technique of settling and separating a solvent-insoluble component by the gravity while keeping the slurry in the tank. Continuous separation treatment is possible by continuously discharging the supernatant liquid and the solids-enriched fluid from the upper part and the lower part, respectively, while continuously feeding the slurry into the tank.

The inside of the gravitational settling tank 7 is preferably held in temperature or heated, and/or pressurized so as to prevent reprecipitation of the solvent-soluble component dissolved out from the coal. The heating temperature herein is typically from 300° C. to 380° C., and the inside pressure of the tank is typically from 1.0 to 3.0 MPa.

The separation of the solution containing the coal component dissolved in the solvent from the slurry obtained from the extraction step may be performed by not the gravitational settling technique, but another technique such as filtration or centrifugal separation.

Ash-Free Coal Obtaining Step

The ash-free coal obtaining step is the step of evaporatively separating the solvent from the solution (supernatant liquid) separated in the separation step to give an ash-free coal (hypercoal; HPC). The ash-free coal obtaining step may include a solvent separation substep of evaporatively separating the solvent from the solution separated in the gravitational settling tank 7 to give a liquid ash-free coal; and a solidification substep of bringing the obtained liquid ash-free coal into contact with a solidifier and thereby cooling the liquid ash-free coal to give a solid ash-free coal having a predetermined shape. The solvent separation substep and the solidification substep are performed in the thin-film distillator 9 and in the water tank 11, respectively, as illustrated in FIG. 1.

Solvent Separation Substep

The solvent separation substep of evaporatively separating the solvent from the solution (supernatant liquid) employs thin-film distillation in the present embodiment. The thin-film distillation refers to a distillation technique in which a distillation object is introduced into the thin-film distillator 9 from its upper part, where the thin-film distillator 9 houses a scraper 9b (also called "wiper"); and a thin film of the distillation object is formed in the inner wall of the thin-film distillator 9 with the scraper 9b to perform distillation continuously. The distillation object herein is the solution separated in the separation step. A heater 9a is arranged around the thin-film distillator 9 and externally heats the thin-film distillator 9 so as to allow the inner wall of the thin-film distillator 9 to have a desired temperature.

The solution (supernatant liquid) separated in the gravitational settling tank 7 and containing the solvent is filtrated in the filter unit 8, then fed to the thin-film distillator 9, and heated by the heater 9a. This allows the solvent to be evaporatively separated from the solution.

The inside pressure of the thin-film distillator 9 may be 0.1 MPa (normal atmospheric pressure) or be 0.1 MPa (normal atmospheric pressure) or less. The heating temperature (the temperature of the thin-film distillator 9 inner wall) is set to a such a temperature as to allow the liquid ash-free coal to remain in liquid form (as to allow the ash-free coal to exhibit plasticity), where the solvent has been evaporatively separated to leave the liquid ash-free coal. The heating temperature may be typically from 200° C. to 450° C.

The way to separate the solvent from the solution (supernatant liquid) is not limited to the thin-film distillation, but may typically be flash vaporization in which the solution is sprayed into the tank to evaporatively separate the solvent. In the flash vaporization, the inside pressure of a flash chamber is set typically at 0.5 MPa and/or the inside temperature of the flash chamber is set typically from 200° C. to 450° C. by heating the tank so as to allow the solvent to evaporate, but to allow the ash-free coal after the solvent separation to remain in liquid form. Allowing the ash-free coal to remain in liquid form is preferably performed not by pressure control, but by heating. This is preferred for enhancing the solvent evaporation.

The solvent separated and recovered in the solvent separation substep can be recycled to and reused in the slurry preparation tank 3.

Solidification Substep

The present embodiment employs liquid water as the solidifier for solidifying the liquid ash-free coal. The liquid ash-free coal obtained in the thin-film distillator 9 is drawn from the thin-film distillator 9, placed (e.g., dropped) as intact (not as a spray but as a liquid having a certain volume) into the water-filled water tank 11, cooled and solidified by the contact with the water. The ash-free coal solidified into clusters of predetermined size is taken out from the water tank 11 with a transporter such as a conveyor belt, dried typically by air drying, and stored in a predetermined place.

The water in the water tank 11 has a temperature lower than a temperature at which the ash-free coal exhibits fluidity. This is true for other solidifiers mentioned later. The water has a temperature of typically from 0° C. to 60° C. The liquid ash-free coal is rapidly cooled with water at room temperature without heating and cooling in a preferred embodiment from the viewpoint of ash-free coal production cost. In another embodiment, the ash-free coal is cooled not in one water tank, but in two or more water-filled water tanks having different water temperatures. This may be achieved by placing the ash-free coal first in a water-filled water tank having a higher water temperature and then in another water-filled water tank having a lower water temperature one by one. This enables fine adjustment of the cooling rate.

The ash-free coal solidification substep is preferably performed in the presence of an inert gas such as nitrogen gas. Specifically in the present embodiment, a pipe is arranged to connect between the thin-film distillator 9 and the water tank 11, and the inert gas is blown into the pipe so as to allow the liquid ash-free coal drawn from the thin-film distillator 9 to be placed into the water in the water tank 11 without coming in contact with the air. Thus, the liquid ash-free coal is allowed to flow down through the pipe and guided into the water tank 11.

The solvent separation substep and the solidification substep yield a solid ash-free coal containing substantially no ash (e.g., having an ash content of 3 percent by weight or less) from the solution (supernatant liquid). The ash-free coal contains little ash, substantially no moisture, and has a heating value (heat output) higher than that of the material coal. In addition, the ash-free coal has significantly better thermoplasticity and can have satisfactory thermoplasticity even when the material coal does not have thermoplasticity. The thermoplasticity is a property particularly important as a coal for iron-making coke. The ash-free coal is therefore usable typically as a coal blend for coke making.

Residue Coal Obtaining Step

The residue coal obtaining step is the step of obtaining a residue coal by evaporatively separating the solvent from the solvent-insoluble-component-enriched fluid (solids-enriched fluid) which has been separated in the gravitational settling tank 7. The residue coal obtaining step also serves as the step of evaporatively separating and recovering the solvent from the solids-enriched fluid and is performed in the solvent separator 10 in FIG. 1. The residue coal obtaining step is not an essential step.

The separation of the solvent from the solids-enriched fluid can employ a regular distillation technique or evaporation technique, such as the flash vaporization. The separated and recovered solvent can be recycled to and reused in the slurry preparation tank 3. The separation and recovery of the solvent allows the solids-enriched fluid to give a residue coal (RC; also called "residual coal") containing ash and other solvent-insoluble components as concentrated. Although containing ash, the residue coal contains substantially no moisture and has a sufficient heating value. Although not exhibiting thermoplasticity, the residue coal, when used in a coal blend, does not adversely affect the thermoplasticity of other coals contained in the coal blend, because oxygen-containing functional groups have been eliminated therefrom. The residue coal may therefore be usable as part of a coal blend for coke making in the same way as common non- or slightly-caking coat. The residue coal may also be used as a fuel for various applications instead of being used as the coal for coke making. The residue coal may be discarded without recovery.

Examples

An experiment was performed in which a solution containing ash-free coal in a concentration of 30 percent by weight (solution containing ash-free coal and a solvent, from which solvent-insoluble solids have been removed) was prepared, heated to 160° C., and fed into a thin-film distillator at a flow rate of 14 kg/hr, where the inner wall of the distillator was heated to 300° C. A liquid ash-free coal, from which the solvent had been evaporatively separated, discharged from the bottom of the thin-film distillator was received by a stainless steel vessel that was at room temperature. The liquid ash-free coal immediately solidified in the stainless steel vessel. The experiment revealed that the liquid ash-free coal has such a property as to immediately solidify upon cooling.

Operation and Advantageous Effects

The ash-free coal exhibits excellent fluidity under high-temperature conditions. The present invention utilizes this property and the property for the liquid ash-free coal to immediately solidify upon cooling, where the latter property has been found this time. The ash-free coal production method according to the present embodiment of the present invention employs the ash-free coal obtaining step in which the solvent is evaporatively separated from the solution to give a liquid ash-free coal, and the liquid ash-free coal is brought into contact with the solidifier (e.g., the water) and thereby solidifies into a predetermined shape. The present invention enables forming of ash-free coal into a solid having a predetermined shape through a series of production steps, i.e., the extraction step, separation step, and ash-free coal obtaining step. The ash-free coal obtaining step enables easy forming of the liquid ash-free coal into a predetermined shape (e.g., a lump or flake (thin-layer) shape). Specifically, the present invention enables forming of ash-free coal without re-liquefaction and eliminates the need of an extra shaping process of ash-free coal upon shipping as a product. The solidification of ash-free coal by the solidifier herein may be performed continuously or discontinuously.

In a preferred embodiment, evaporative separation of the solvent from the solution is performed not by pressure control, but by heating so as to allow the liquid ash-free coal to remain in liquid form, where the liquid ash-free coal is obtained in the midway of the ash-free coal obtaining step. This allows the ash-free coal to remain in liquid form while suitably maintaining the solvent evaporation.

In another preferred embodiment, thin-film distillation is employed. This enables reliable scrape off of a thin film layer formed on the thin-film distillator inner wall with a scraper (wiper) and reliable guidance of even a low-fluidity (high-viscosity) ash-free coal to the solidification substep.

In a preferred embodiment, the solidifier in the solidification substep has a temperature lower than a temperature at which the ash-free coal exhibits fluidity. This contributes to reliable solidification of the liquid ash-free coal. In a more preferred embodiment, the solidifier has a temperature of from 0° C. to 150° C.

In another embodiment, water is employed as the solidifier. This saves the facilities cost.

In another embodiment, the liquid ash-free coal is solidified in the ash-free coal obtaining step by bringing the liquid ash-free coal into contact with the solidifier in the presence of an inert gas. This protects the ash-free coal from oxidation and helps the same to maintain fluidity at high level under high-temperature conditions. The ash-free coal, when oxidized, suffers from inferior fluidity.

Second Embodiment

The ash-free coal production method according to the second embodiment will be illustrated with reference to FIG. 2.

The present embodiment employs a metallic endless belt as the solidifier for solidifying the liquid ash-free coal, instead of water employed in the first embodiment. Ash-free coal production equipment 101 according to the present embodiment has a structure in which a conveyor belt 12 is incidental to a thin-film distillator 9. The conveyor belt 12 includes a metallic endless belt 12a running between a pair of rollers.

The liquid ash-free coal obtained in the thin-film distillator 9 is drawn from the thin-film distillator 9, dropped as intact (not as a spray, but as a liquid having a certain volume) onto the metallic endless belt 12a and solidified by the contact with the endless belt 12a and by a gas (e.g., air or nitrogen) surrounding the endless belt 12a. The solidified ash-free coal is obtained in flake form (thin layer form), transferred typically with the conveyor belt 12, and stored in a predetermined place.

The temperatures of the endless belt 12a and of the gas surrounding the endless belt 12a may each be typically from 20° C. to 150° C. In a preferred embodiment, the liquid ash-free coal is solidified at room temperature and under normal atmospheric pressure by using an endless belt 12a at room temperature. This is preferred from the viewpoint of ash-free coal production cost. A material for the endless belt 12a is exemplified by iron, stainless steel, and a resin. A resinous endless belt, when used, should be made from a resin having a melting point sufficiently higher than that of the liquid ash-free coal. In a preferred embodiment, an endless belt made from a metal such as iron or stainless steel is used, typically because such metallic endless belt can be applied to liquid ash-free coals at various temperatures and has satisfactory thermal conductivity.

In a preferred embodiment, the ash-free coal solidification substep in the present embodiment is performed in the presence of an inert gas such as nitrogen gas, as in the first embodiment. For example, the solidification substep is performed in the presence of an inert gas by covering the periphery of the endless belt 12a of the conveyor belt 12 typically with a steel sheet and blowing the inert gas into the conveyor belt 12.

Operation and Advantageous Effects

The use of a conveyor belt as the solidifier allows the one conveyor belt to preform both solidification and conveying of the ash-free coal, and this saves the facilities cost.

Third Embodiment

Figure 3:
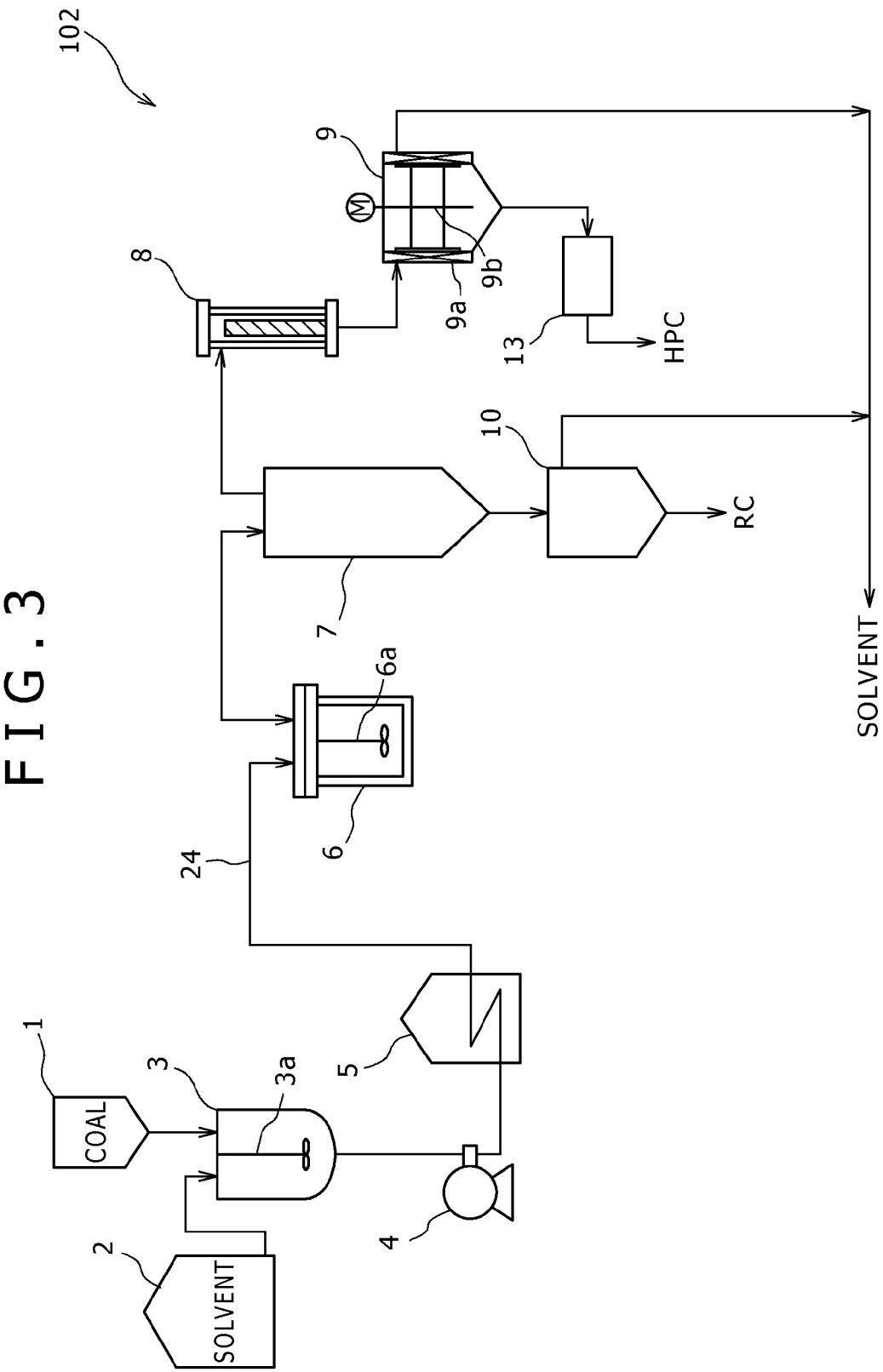
FIG. 3 is a block diagram illustrating ash-free coal production equipment for the explanation of an ash-free coal production method according to a third embodiment of the present invention.

The ash-free coal production method according to the third embodiment will be illustrated with reference to FIG. 3. The present embodiment employs a forming die 13 having a cavity with a predetermined shape as the solidifier for solidifying the liquid ash-free coal, instead of water as in the first embodiment. Ash-free coal production equipment 102 according to the present embodiment has a structure in which the forming die 13 is arranged downstream from the thin-film distillator 9. The cavity of the die 13 has such a shape as to form the liquid ash-free coal typically into briquettes.

The liquid ash-free coal obtained in the thin-film distillator 9 is drawn from the thin-film distillator 9, poured as intact (not as a spray, but as a liquid having a certain volume) into the die 13, and solidified in the die 13. The solidified ash-free coal is obtained typically in briquette form, transferred by a transporter such as a conveyor belt, and stored in a predetermined place.

The die 13 may have a temperature (forming temperature) of typically from 0° C. to 150° C. In a preferred embodiment from the viewpoint of ash-free coal production cost, the die 13 at room temperature without heating and cooling is employed. The die 13 may be a die (mold) made of a metal such as iron or stainless steel.

The ash-free coal solidification substep in the present embodiment is preferably performed in the presence of an inert gas such as nitrogen gas as in the first embodiment. Typically in an embodiment, the thin-film distillator 9 and the die 13 are connected by a pipe, and the inert gas is blown into the pipe so that the liquid ash-free coal drawn from the thin-film distillator 9 can be poured into the die 13 without coming in contact with the air. Thus the liquid ash-free coal is allowed to flow down through the pipe and poured into the die 13.

Operation and Advantageous Effects

The ash-free coal production method using a forming die having a cavity with a predetermined shape as the solidifier enables reliable forming of an ash-free coal into a desired shape. In addition, the method enables easy forming of ash-free coals having a variety of shapes typically by using another die.

Fourth Embodiment

Figure 4:
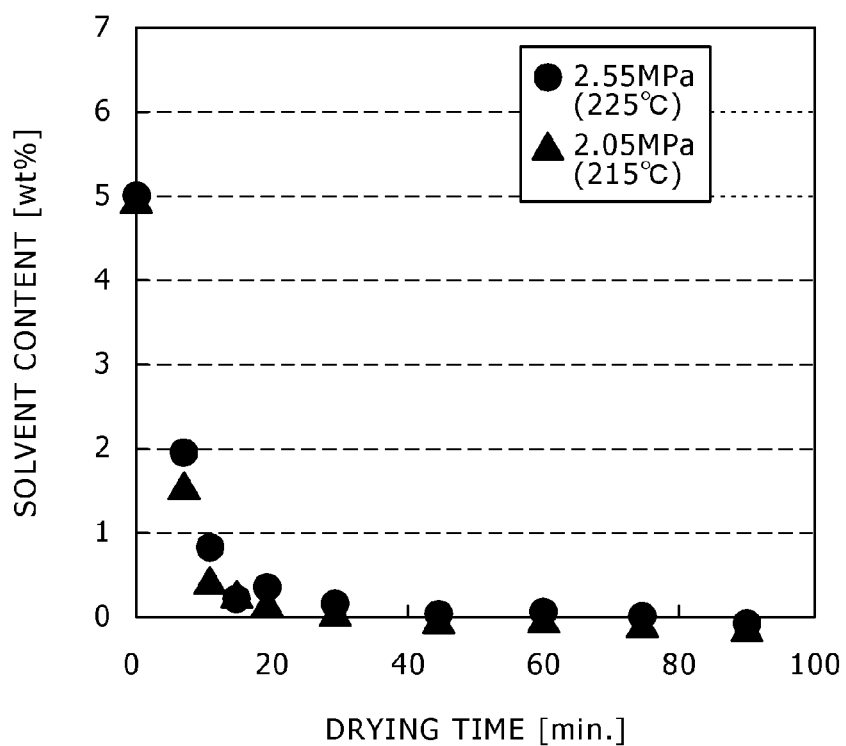
FIG. 4 is a graph illustrating measurement results on solvent content.
Figure 6:
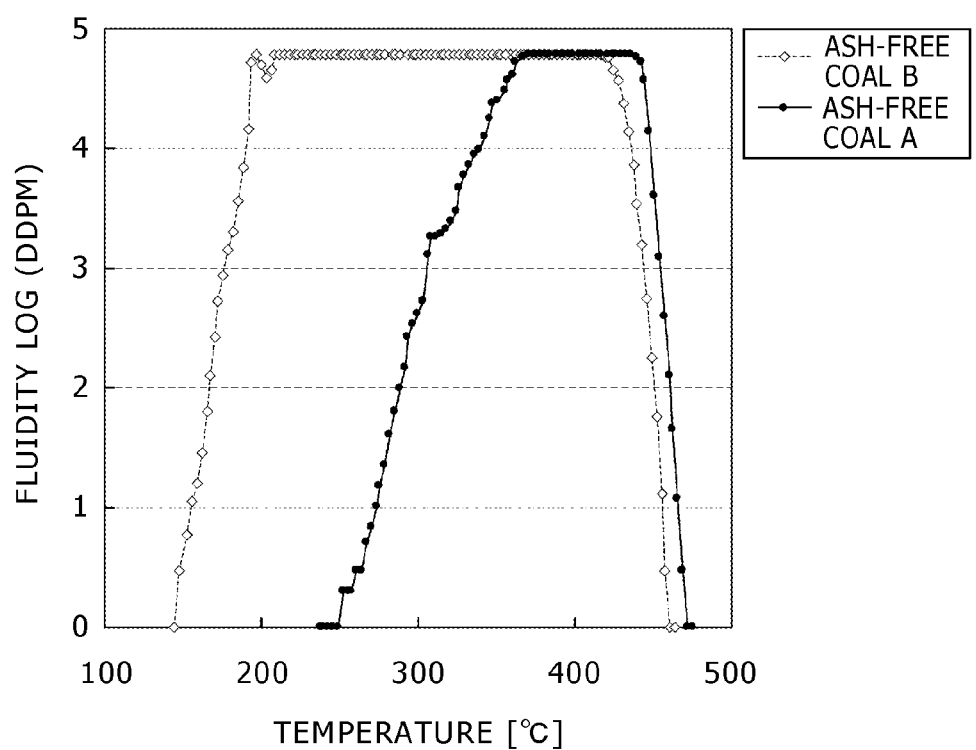
FIG. 6 is a graph illustrating measurement results on fluidity.

An ash-free coal production method according to the fourth embodiment will be illustrated with reference to FIGS. 4 to 6. In the method according to the present embodiment, the ash-free coal obtaining step is performed so that the solvent remains in the ash-free coal. In an embodiment, the solvent remains in the ash-free coal in a content of from 2.0 percent by weight to 50 percent by weight. The ash-free coal produced according to the present embodiment contains the solvent. The residual solvent content is more preferably 25 percent by weight or less, and furthermore preferably 10 percent by weight or less in terms of its upper limit. According to a customary ash-free coal production method of removing approximately 100 percent by weight of the solvent from the solution, the resulting ash-free coal has a residual solvent content of from 0 to 2 percent by weight. The term "content of residual solvent (residual solvent content)" in the ash-free coal refers to the content (percentage) of the residual solvent in the ash-free coal based on the total amount of the mixture of the ash-free coal and the residual solvent.

Exemplary processes to allow the solvent to remain in the ash-free coal include a process of evaporatively separating the solvent from the solution at a temperature lower than the temperature necessary for removing approximately 100 percent by weight (99 percent by weight or more) of the solvent from the solution; a process of evaporatively separating the solvent from the solution for a time (duration) shorter than the time necessary for removing approximately 100 percent by weight (99 percent by weight or more) of the solvent from the solution; and a process as a combination of the two processes. Of the processes, preferred is the process of evaporatively separating the solvent at a temperature lower than the temperature necessary for removing approximately 100 percent by weight of the solvent from the solution. The process is preferred because of less affecting the properties of the resulting ash-free coal. Evaporative separation of the solvent, when performed by the process, is performed at a temperature of preferably from 180° C. to 320° C., and more preferably from 200° C. to 240° C. When approximately 100 percent by weight of the solvent is to be removed from the solution, the evaporative separation is performed at a temperature of from 250° C. to 300° C.

The ash-free coal, when allowed to contain the residual solvent as above, can be obtained with a higher yield because of having a mass increased by the mass of the solvent. The ash-free coal has a lower initial softening temperature, as described later. In addition, there occurs such a phenomenon that the ash-free coal is dissolved in the solvent. The ash-free coal can therefore exhibit fluidity at a lower temperature. Accordingly, the ash-free coal containing the solvent can be handled as a liquid at a temperature lower than that of an ash-free coal containing little solvent. In a preferred embodiment, the ash-free coal contains the residual solvent in a content of from 2.0 percent by weight to 10 percent by weight. The ash-free coal produced according to this embodiment is advantageously usable as coal for iron-making coke, even the ash-free coal contains the residual solvent.

Solvent Content Measurement

Next, evaporative separation of a solvent from a solution was performed in the ash-free coal obtaining step, and how the solvent content changes with time was determined. Specifically, solid-form ash-free coal containing 5 percent by weight of the solvent was dried with a steam tube dryer under two different conditions, i.e., at a steam pressure of 2.05 MPa (215° C.) and a steam pressure of 2.55 MPa (225° C.). The results are indicated in FIG. 4.

The solvent content significantly reduced between the drying start and a lapse of 12 minutes and reached 1 percent by weight or less thereafter. Eight (8) minutes into drying, the solvent content became 2 percent by weight. This demonstrates that, when the drying is performed for a shorter time, the solvent content in the ash-free coal increases, and the ash-free coal can be obtained in a higher yield due to the residual solvent in the ash-free coal. The ash-free coal used in the measurement, when dried over 12 minutes or longer to a solvent content of 1 percent by weight or less, was produced in a yield from the material coal of 42.3 percent by weight (dry base). The ash-free coal, when produced by drying for a time of 8 minutes, was obtained in a higher yield of 43.2 percent by weight (dry base).

Solvent Content Measurement

Subsequently, evaporative separation of a solvent from a solution was performed in the ash-free coal obtaining step, and the content of the residual solvent in the ash-free coal was measured. Specifically, a solution having an ash-free coal concentration of 30 percent by weight was heated to 160° C. and poured into a thin-film distillator whose inner wall was heated to 300° C. In this process, the solution was poured into the thin-film distillator at different flow rates of 4.5 kg/h, 9.2 kg/h, 16.9 kg/h, and 18.2 kg/h. An ash-free coal discharged from the bottom of the thin-film distillator, whose temperature was measured, was received in a stainless steel vessel. The ash-free coal was immediately solidified on the stainless steel vessel. The amount (content) of the residual solvent in the ash-free coal discharged from the bottom of the thin-film distillator was measured to examine how the amount of the residual solvent varies depending on the temperature of the ash-free coal at the outlet of the thin-film distillator. FIG. 5 illustrates how the content of the residual solvent in the ash-free coal varies depending on the ash-free coal temperature at the outlet of the thin-film distillator.

The ash-free coal temperature at the thin-film distillator outlet decreases with an increasing flow rate of the solution flowing into the thin-film distillator. Specifically, in FIG. 5, a point at an ash-free coal temperature of 291° C. corresponds to the lowest flow rate of 4.5 kg/h; and a point at an ash-free coal temperature of 276° C. corresponds to the highest flow rate of 18.2 kg/h. The data demonstrate that the content of the residual solvent in the ash-free coal decreased with an elevating ash-free coal temperature at the thin-film distillator outlet. This demonstrates that the ash-free coal can contain the residual solvent in a larger amount and can be produced in a higher yield with a lowering ash-free coal temperature at the thin-film distillator outlet (with an increasing flow rate of the solution). The ash-free coal, when produced via drying under such conditions that the ash-free coal temperature at the thin-film distillator outlet be 276° C., contained the solvent in a content of 10 percent by weight. The ash-free coal used in the measurement, when produced so as to have a solvent content of 1 percent by weight or less, was produced from the material coal in a yield of 42.3 percent by weight (dry base). The ash-free coal, when produced via drying under such conditions that the ash-free coal temperature at the thin-film distillator outlet be 276° C., was produced in a higher yield of 47.0 percent by weight (dry base).

Fluidity Measurement

Next, an ash-free coal containing a solvent and an ash-free coal containing substantially no solvent were prepared to measure fluidity respectively. Specifically, the solvent was distilled and recovered by a flash method in the ash-free coal obtaining step. In this process, the solvent was evaporated by heating the inner wall of a flash chamber to 320° C., higher than the boiling point of the solvent, and scattering the solution to the inner wall of the flash chamber to evaporate the solvent. Ash-free coal A and ash-free coal B were obtained by performing the solvent recovery over 7 hours and over 2 hours, respectively. The ash-free coal A contained the residual solvent in a content of 0.51 percent by weight; whereas the ash-free coal B contained the residual solvent in a content of 23.3 percent by weight. The Gieseler fluidity was measured on the ash-free coals A and B. The results are indicated in FIG. 6 and Table 1.

TABLE 1

| | Initial softening temperature (° C.) | Maximum plastic range (° C.) | Solidification temperature (° C.) | Maximum fluidity (ddpm) |
|---|---|---|---|---|
| Ash-free coal A | 246 | 379-433 | 475 | >60011 |
| Ash-free coal B | 150 | 235-423 | 467 | >60011 |

The ash-free coal B containing the solvent in a content of 23.3 percent by weight had an initial softening temperature of 150° C., significantly lower than that of the ash-free coal A (246° C.) containing little solvent. The ash-free coal B containing the solvent had a maximum plastic range wider than that of the ash-free coal A containing little solvent. This demonstrates that the solvent as a liquid, when remaining in the ash-free coal, helps the ash-free coal to have a lower initial softening temperature, to be capable of exhibiting fluidity at a lower temperature, and to be handleable as a liquid at a lower temperature. There was no difference in solidification temperature between the ash-free coal B and the ash-free coal A, because most of the solvent had been evaporated upon solidification.

Advantageous Effects

As is described above, the ash-free coal production method according to the present embodiment separates a solution as a liquid in the separation step. When the solvent is evaporatively separated from the solution to give an ash-free coal, the method allows the solvent to remain as a liquid in the resulting ash-free coal. This configuration helps the ash-free coal to be produced in a higher yield because of having a mass larger by the mass of the solvent. The ash-free coal, as containing the residual solvent therein, has a lower initial softening temperature, can thereby exhibit fluidity at a lower temperature, and can be handled as a liquid at a lower temperature. Thus, the ash-free coal can be handled with better handleability.

The method, when adapting the residual solvent content in ash-free coal to be from 2.0 percent by weight to 10 percent by weight, can give ash-free coal that is usable as a coal for iron-making coke.

The method, when performing the evaporative separation at a temperature lower than such a temperature as to remove 99 percent by weight or more of the solvent from the solution, can allow the solvent to remain in the ash-free coal suitably while less affecting the properties of the ash-free coal.

While the present invention has been described above with reference to preferred embodiments thereof, it is to be understood that the embodiments are never intended to limit the scope of the invention; and that various modifications and changes can be made therein without departing from the spirit and scope of the appended claims.

REFERENCE SIGNS LIST

1: coal hopper
2: solvent tank
3: slurry preparation tank
4: transfer pump
5: preheater
6: extractor
7: gravitational settling tank
8: filter unit
9: thin-film distillator
10: solvent separator
11: water tank
100: ash-free coal production equipment

The invention claimed is:

1. A method for producing an ash-free coal, the method comprising the steps of;
   extracting a solvent-soluble coal component from coal by mixing the coal with a solvent to prepare a slurry and heating the prepared slurry;
   separating a solution containing the coal component from the slurry containing the extracted coal component, where the coal component is extracted in the extraction step; and
   obtaining an ash-free coal by evaporatively separating the solvent from the solution separated in the separation step,
   wherein the ash-free coal obtaining step is performed so as to allow the solvent to remain in the ash-free coal; and
   a content of the residual solvent remaining in the ash-free coal is from 2.0 percent by weight to 10 percent by weight.

* * * * *